(12) United States Patent
Lavine

(10) Patent No.: US 11,681,575 B2
(45) Date of Patent: Jun. 20, 2023

(54) ORDERED DATA SUB-COMPONENT EXTRACTION

(71) Applicant: Arm Limited, Cambridge (GB)

(72) Inventor: Mark Gerald Lavine, Austin, TX (US)

(73) Assignee: Arm Limited, Cambridge (GB)

( * ) Notice: Subject to any disclaimer, the term of this patent is extended or adjusted under 35 U.S.C. 154(b) by 190 days.

(21) Appl. No.: 17/343,820

(22) Filed: Jun. 10, 2021

(65) Prior Publication Data

US 2022/0398145 A1 Dec. 15, 2022

(51) Int. Cl.
*G06F 11/00* (2006.01)
*G06F 11/07* (2006.01)
*G06F 13/40* (2006.01)

(52) U.S. Cl.
CPC ...... *G06F 11/0763* (2013.01); *G06F 11/0709* (2013.01); *G06F 13/4027* (2013.01)

(58) Field of Classification Search
CPC ............. G06F 11/0763; G06F 11/0709; G06F 13/4027; H04L 1/14; H04L 1/0083
USPC ........................................ 714/750, 776, 819
See application file for complete search history.

(56) References Cited

U.S. PATENT DOCUMENTS

| | | | | |
|---|---|---|---|---|
| 4,495,620 A * | 1/1985 | Steele | ................. | H04L 27/2604 375/240 |
| 11,290,848 B2 * | 3/2022 | Sharma | ............... | H04W 12/037 |
| 2003/0074538 A1 * | 4/2003 | Arimilli | ............. | G06F 12/1054 714/E11.204 |
| 2003/0074539 A1 * | 4/2003 | Arimilli | ............. | G06F 12/1036 711/E12.068 |
| 2003/0074540 A1 * | 4/2003 | Arimilli | .................. | G06F 9/342 711/204 |
| 2013/0346823 A1 * | 12/2013 | Cideciyan | ........... | H04L 25/4908 714/752 |
| 2014/0160935 A1 * | 6/2014 | Zecharia | ............... | H04L 12/185 370/235 |
| 2018/0039531 A1 * | 2/2018 | Lowell | ................ | G06F 9/30101 |
| 2022/0035974 A1 * | 2/2022 | Kitano | .................... | G06F 30/27 |

* cited by examiner

*Primary Examiner* — Albert Decady
*Assistant Examiner* — Osman M Alshack
(74) *Attorney, Agent, or Firm* — Nixon & Vanderhye P.C.

(57) ABSTRACT

Apparatuses and methods for extracting ordered data sub-components from a data item are disclosed. A received data item has a data structure to accommodate multiple data sub-components. The data item indicates which data sub-components are valid. Adders sum respective subsets of indications of the valid data sub-component positions, with each adder covering one more position than the previous adder. Transitions of the counts generated by the respective adders are used to determine the ordinal valid data sub-component positions in the data item, which can then be output on the basis of the data item and the identified transition positions. Without requiring feedback paths from an identified earlier ordinal position to identify a later ordinal position, the set of ordered data sub-components can be extracted more quickly.

13 Claims, 8 Drawing Sheets

ORDERED DATA SUB-COMPONENT EXTRACTION

TECHNICAL FIELD

The present disclosure relates to data processing. In particular, the present disclosure relates to extracting ordered data sub-components from a data item.

DESCRIPTION

There may be a variety of contexts in which data sub-components need to be extracted from the data item and in which the order of those data sub-components within the data item needs to be preserved for the purpose of their subsequent handling. For example in the context of data items which are transmitted, a given data item which is transmitted as a single unit to a data processing apparatus may comprise multiple data sub-components, where the ordering of the data sub-components within the data item affects how those data sub-components are handled by the data processing apparatus. Moreover some contemporary contexts may require that the identification of the data sub-components within the data item together with their ordering is performed very quickly, for example so that data items may be received and processed at high frequency.

SUMMARY

In one example described herein there is an apparatus comprising:

reception circuitry configured to receive a data item, wherein the data item has a data structure to accommodate up to N data sub-components at N respective positions within the data item, wherein the N respective positions run from a first position to a last position in the data item and wherein N is a plural value;

sub-component indicator extraction circuitry configured to extract a set of N indications from the data structure, wherein a valid indication of the set of N indications indicates that there is a valid data sub-component at an equivalent position of the N positions within the data item;

adder circuitry comprising N−1 adders, wherein each adder of the N−1 adders corresponds to a corresponding position of the N positions within the data item and each adder is configured to sum a subset of the set of N indications, wherein the subset comprises all valid indications inclusively from the first position of the N positions within the data item to the corresponding position of the N positions within the data item;

ordinal sub-component determination circuitry configured to determine a first valid data sub-component position in the data item where the respective sums of the N−1 adders transition to a value of one from a value of zero or where a valid indication at the first position has a value of one, and the ordinal sub-component determination circuitry is configured to determine at least one further ordinal valid data sub-component position in the data item where the respective sums of the N−1 adders transition to a value of X from a value of X−1, wherein X−1 is the ordinality of the further ordinal position; and multiplexing circuitry configured to output a first valid data sub-component and at least one further ordinal valid data sub-component from the data item, wherein the multiplexing circuitry is controlled by the first valid data sub-component position and the at least one further ordinal valid data sub-component position determined by the ordinal sub-component determination circuitry.

In one example described herein there is a method comprising:

receiving a data item, wherein the data item has a data structure to accommodate up to N data sub-components at N respective positions within the data item, wherein the N respective positions run from a first position to a last position in the data item and wherein N is a plural value;

operating sub-component indicator extraction circuitry to extract a set of N indications from the data structure, wherein a valid indication of the set of N indications indicates that there is a valid data sub-component at an equivalent position of the N positions within the data item;

operating adders comprising N−1 adders, wherein each adder of the N−1 adders corresponds to a corresponding position of the N positions within the data item and each adder is configured to sum a subset of the set of N indications, wherein the subset comprises all valid indications inclusively from the first position of the N positions within the data item to the corresponding position of the N positions within the data item;

operating ordinal sub-component determination circuitry to determine a first valid data sub-component position in the data item where the respective sums of the N−1 adders transition to a value of one from a value of zero or where a valid indication at the first position has a value of one;

determining at least one further ordinal valid data sub-component position in the data item where the respective sums of the N−1 adders transition to a value of X from a value of X−1, wherein X−1 is the ordinality of the further ordinal position; and outputting a first valid data sub-component and at least one further ordinal valid data sub-component from the data item, in dependence on the first valid data sub-component position and the at least one further ordinal valid data sub-component position determined by the ordinal sub-component determination circuitry.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
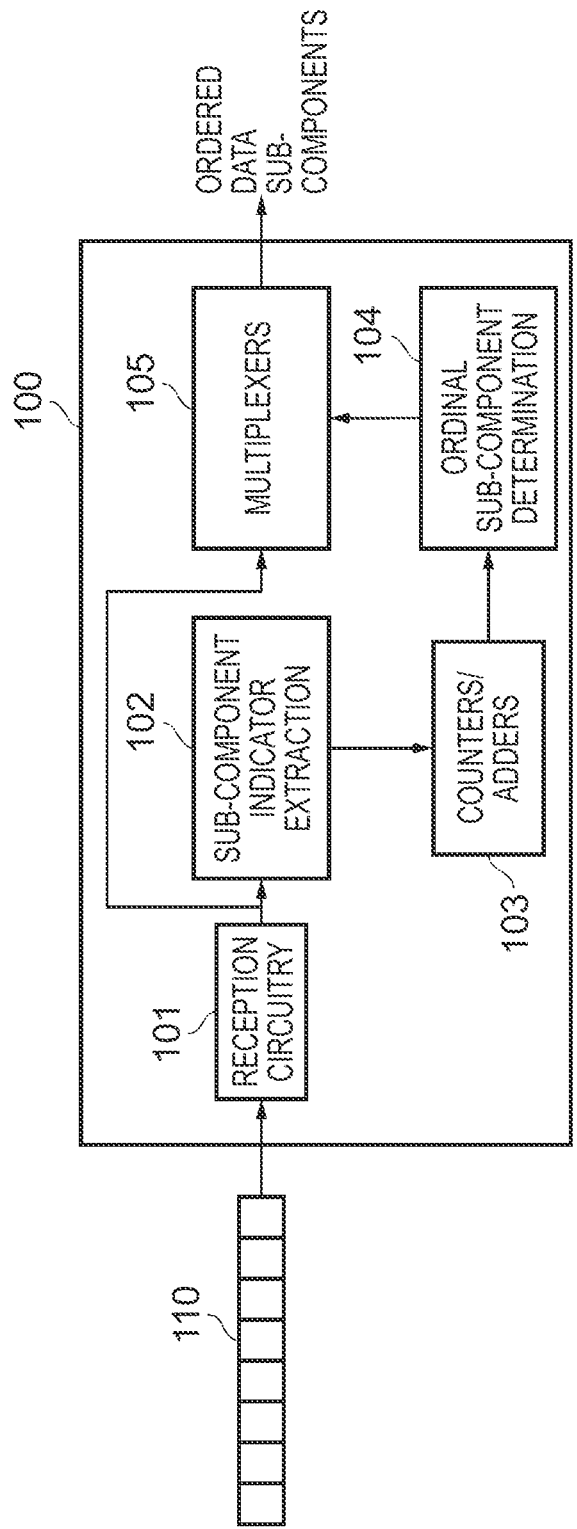
FIG. 1 schematically illustrates an apparatus according to some examples.

Before discussing the embodiments with reference to the accompanying figures, the following description of embodiments is provided.

In accordance with one example configuration there is provided apparatus comprising:

reception circuitry configured to receive a data item, wherein the data item has a data structure to accommodate up to N data sub-components at N respective positions within the data item, wherein the N respective positions run from a first position to a last position in the data item and wherein N is a plural value;

sub-component indicator extraction circuitry configured to extract a set of N indications from the data structure, wherein a valid indication of the set of N indications indicates that there is a valid data sub-component at an equivalent position of the N positions within the data item;

adder circuitry comprising N−1 adders, wherein each adder of the N−1 adders corresponds to a corresponding position of the N positions within the data item and each adder is configured to sum a subset of the set of N indications, wherein the subset comprises all valid indications inclusively from the first position of the N positions within the data item to the corresponding position of the N positions within the data item;

ordinal sub-component determination circuitry configured to determine a first valid data sub-component position in the data item where the respective sums of the N−1 adders transition to a value of one from a value of zero or where a valid indication at the first position has a value of one, and the ordinal sub-component determination circuitry is configured to determine at least one further ordinal valid data sub-component position in the data item where the respective sums of the N−1 adders transition to a value of X from a value of X−1, wherein X−1 is the ordinality of the further ordinal position; and multiplexing circuitry configured to output a first valid data sub-component and at least one further ordinal valid data sub-component from the data item, wherein the multiplexing circuitry is controlled by the first valid data sub-component position and the at least one further ordinal valid data sub-component position determined by the ordinal sub-component determination circuitry.

The present techniques are proposed with a particular view to enabling the extraction of data sub-components to be performed quickly and avoiding some of the drawbacks of conventional techniques. In particular the approach taken by the present techniques of implementing adders which independently allow the determination of a data sub-component position without knowing the position of the previous data sub-component. On the basis of valid data sub-component positions provided by the data item, count values are established by the adders which, taken in pairs, enabling transitions of the count value to be identified between pairs and thus ordered data sub-component positions. Significantly this approach enables these positions to be determined without positional feedback paths (e.g. where the position of the first data sub-component is an input in the determination of the second data sub-component, where the position of the second data sub-component is an input in the determination of the third data sub-component, and so on). The avoidance of such feedback paths means that the timing of the combinatorial path is improved, allowing the unpacking of the data sub-components to occur within one clock cycle.

The ordered valid data sub-component positions determined by the ordinal sub-component determination circuitry may be used in a variety of ways in the control of the multiplexing circuitry, but in some examples the ordinal sub-component determination circuitry is configured to generate one-hot sequences as indications of the first valid data sub-component position and the at least one further ordinal valid data sub-component position for control of the multiplexing circuitry.

The present techniques are not limited to any particular multiplicity of the ordinal valid data sub-components which are to be extracted from the data item and accordingly in some examples the ordinal sub-component determination circuitry is configured to determine plural further ordinal valid data sub-component positions in the data item.

The adder circuitry may be implemented in a variety of ways and in some examples the adder circuitry comprises counters configured to count the respective subsets of the set of N indications.

The data item and the respective data sub-components may be provided in a great variety of contexts but in some examples the apparatus further comprises transmission circuitry configured to transmit the first valid data sub-component and the at least one further ordinal valid data sub-component output from the multiplexing circuitry to respective recipients indicated in the data item.

The data item and the respective data sub-components may have a great variety of forms and semantic meaning, but in some examples the data sub-components of the data item comprise messages for conveyance to the respective recipients, wherein the messages comprise:

request messages;
response messages; and/or
data transmission messages.

In some examples the apparatus forms part of interconnect circuitry which couples multiple system components to one another and the reception circuitry is configured to receive the data item from one of the multiple system components, and wherein the transmission circuitry configured to transmit the first valid data sub-component and the at least one further ordinal valid data sub-component output from the multiplexing circuitry to respective recipient system components of the multiple system components as indicated in the data item.

In some examples the data sub-components of the data item comprise messages for conveyance to the respective recipients, wherein the messages comprise:

read data;
snoop data;
request data; and/or
snoop responses.

The validity of the possible data sub-components in the data item may be indicated in a variety of ways but in some examples valid data sub-components are indicated by a respective set of validity bits in the data item. In some examples valid data sub-components are indicated by a header information in the data item.

In accordance with one example configuration there is provided interconnect circuitry comprising the apparatus in any of the forms set out above.

In accordance with one example configuration there is provided a system-on-chip comprising the apparatus in any of the forms set out above.

In accordance with one example configuration there is provided a method comprising:

receiving a data item, wherein the data item has a data structure to accommodate up to N data sub-components at N respective positions within the data item, wherein the N respective positions run from a first position to a last position in the data item and wherein N is a plural value;

operating sub-component indicator extraction circuitry to extract a set of N indications from the data structure, wherein a valid indication of the set of N indications indicates that there is a valid data sub-component at an equivalent position of the N positions within the data item;

operating adders comprising N−1 adders, wherein each adder of the N−1 adders corresponds to a corresponding position of the N positions within the data item and each adder is configured to sum a subset of the set of N indications, wherein the subset comprises all valid indications inclusively from the first position of the N positions within the data item to the corresponding position of the N positions within the data item;

operating ordinal sub-component determination circuitry to determine a first valid data sub-component position in the data item where the respective sums of the N−1 adders transition to a value of one from a value of zero or where a valid indication at the first position has a value of one;

determining at least one further ordinal valid data sub-component position in the data item where the respective sums of the N−1 adders transition to a value of X from a value of X−1, wherein X−1 is the ordinality of the further ordinal position; and outputting a first valid data sub-component and at least one further ordinal valid data sub-component from the data item, in dependence on the first valid data sub-component position and the at least one further ordinal valid data sub-component position determined by the ordinal sub-component determination circuitry.

Particular embodiments will now be described with reference to the figures.

FIG. 1 illustrates a data processing apparatus 100 in accordance with one embodiment. The apparatus comprises reception circuitry 101, which is arranged to receive a data item 110, wherein the data item has a data structure to accommodate multiple data sub-components. Sub-component indicator extraction circuitry 102 determines the positions of valid data sub-components in the data item (as will be described in more detail below with reference to FIGS. 2A-2C). Counter/adder circuitry 103 is arranged to generate certain sums of the valid data sub-component positions in the data item (as will be described in more detail below with reference to FIG. 3). On the basis of the sums generated by the counter/adder circuitry 103, the ordinal sub-component determination circuitry 104 is arranged to determine the ordering of the valid data sub-components, i.e. the position of the first data sub-component, the position of the second data sub-component, and so on as appropriate. Finally the apparatus 100 comprises multiplexers 105, which take the data item received from the reception circuitry 101 as an input and under the control of information received from the ordinal sub-component determination circuitry 104 output ordered data sub-components.

Figure 2A:
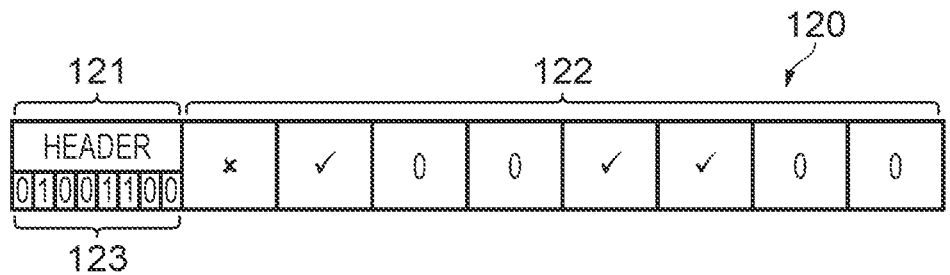
FIGS. 2A and 2B schematically illustrates the configuration of validity indicator is for data sub-components in a data item according to some examples.
Figure 2B:
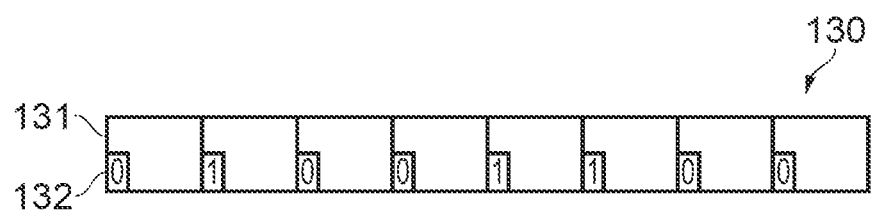
Figure 2C:
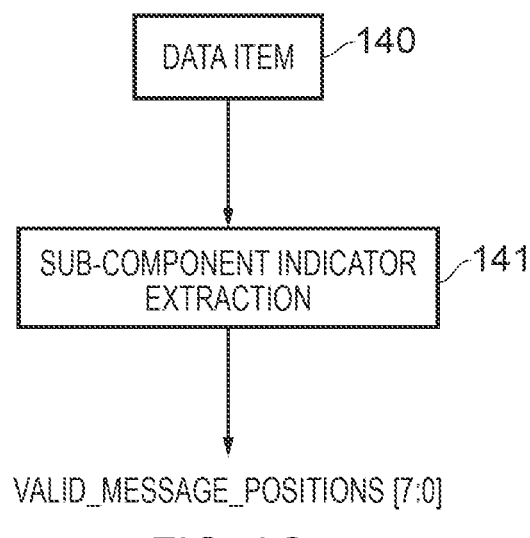
FIG. 2C schematically illustrates some components validity indication extraction according to some examples.

There are various ways in which the validity of the data sub-components may be indicated within the data item and thus correspondingly how the sub-component indicator extraction circuitry 102 may operate in order to extract those valid data sub-component positions. FIG. 2A gives an example of a data item 120 comprising a header portion 121 and a payload portion 122, wherein part of the information presented by the header portion 121 includes a set of validity indicators 123. Thus the value of a given validity indicator determines the validity of a corresponding data sub-component within the payload portion 122. In other examples the validity indicator is more directly associated with the data sub-components to which they apply and FIG. 2B gives an example. Here a data item 130 comprises multiple data sub-components 131, wherein a validity indicator 132 forms part of each data sub-component. FIG. 2C schematically illustrates the manner in which a received data item 140 is processed by component indicator extraction circuitry 141, which is appropriately configured in dependence on the type of data items it is intended to receive and where the validity indications will be present within the data item, and generates a set of data sub-component validity indications. In the example shown this is for a data item which can comprise up to 8 valid data sub-components and hence the sub-component indicator extraction circuitry 141 generates an 8-bit value VALID_MESSAGE_POSITIONS[7:0]. It will therefore be understood that this example is presented in the context of an apparatus which handles data items which comprise sub-component "messages", but the present techniques are not limited to any particular type of data sub-component content.

Figure 3:
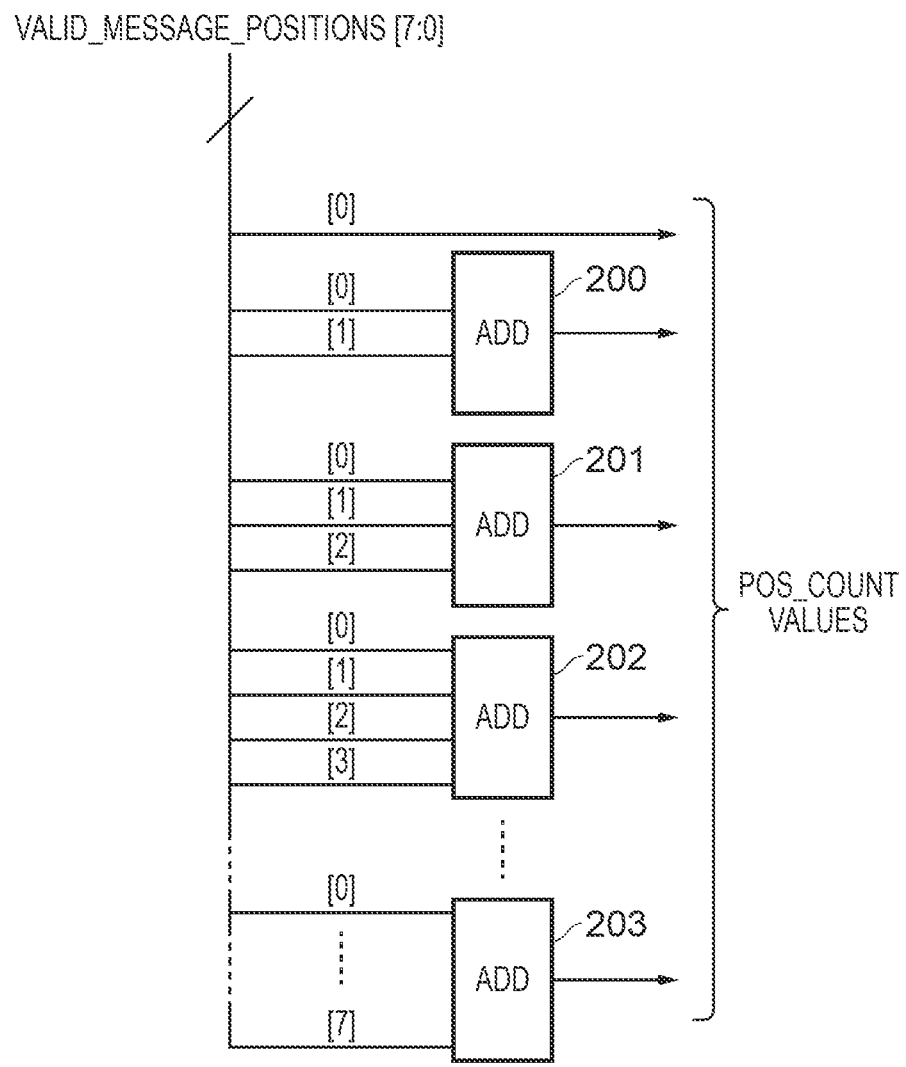
FIG. 3 schematically illustrates adder circuitry to generate position counter values according to some examples.

The set of indications of the valid data sub-components in the data item is provided as an input to adder circuitry which is arranged to generate a number of sums from the set of indications. FIG. 3 schematically illustrates the configuration of such adder circuitry in some examples. The particular configuration illustrated is once more shown in the (merely exemplary) context of an apparatus which handles data items which comprise sub-component messages, as in the case of FIG. 2C. The arrangement of the adder circuitry shows a sequence of adders 200, 201, 202, 203, where each is arranged to take one more input than the preceding adder. Abbreviating VALID_MESSAGE_POSITIONS[7:0] to P[7:0], the first output of this adder circuitry (as a group) is P[0]. The second output (from adder 200) is the sum of P[0] and P[1]. The third output (from adder 201) is the sum of P[0], P[1], and P[2]. This sequence continues to adder 203, which outputs the sum of all of P[0] to P[7]. Accordingly the full set of POS_COUNT values generated are:

POS_COUNT0=$P$[0]

POS_COUNT1=$P$[0]+$P$[1]

POS_COUNT2=$P$[0]+$P$[1]+$P$[2]

POS_COUNT3=$P$[0]+$P$[1]+$P$[2]+$P$[3]

POS_COUNT4=$P$[0]+$P$[1]+$P$[2]+$P$[3]+$P$[4]

POS_COUNT5=$P$[0]+$P$[1]+$P$[2]+$P$[3]+$P$[4]+$P$[5]

POS_COUNT6=$P$[0]+$P$[1]+$P$[2]+$P$[3]+$P$[4]+$P$[5]+$P$[6]

POS_COUNT7=$P$[0]+$P$[1]+$P$[2]+$P$[3]+$P$[4]+$P$[5]+$P$[6]+$P$[7]

Figure 4:
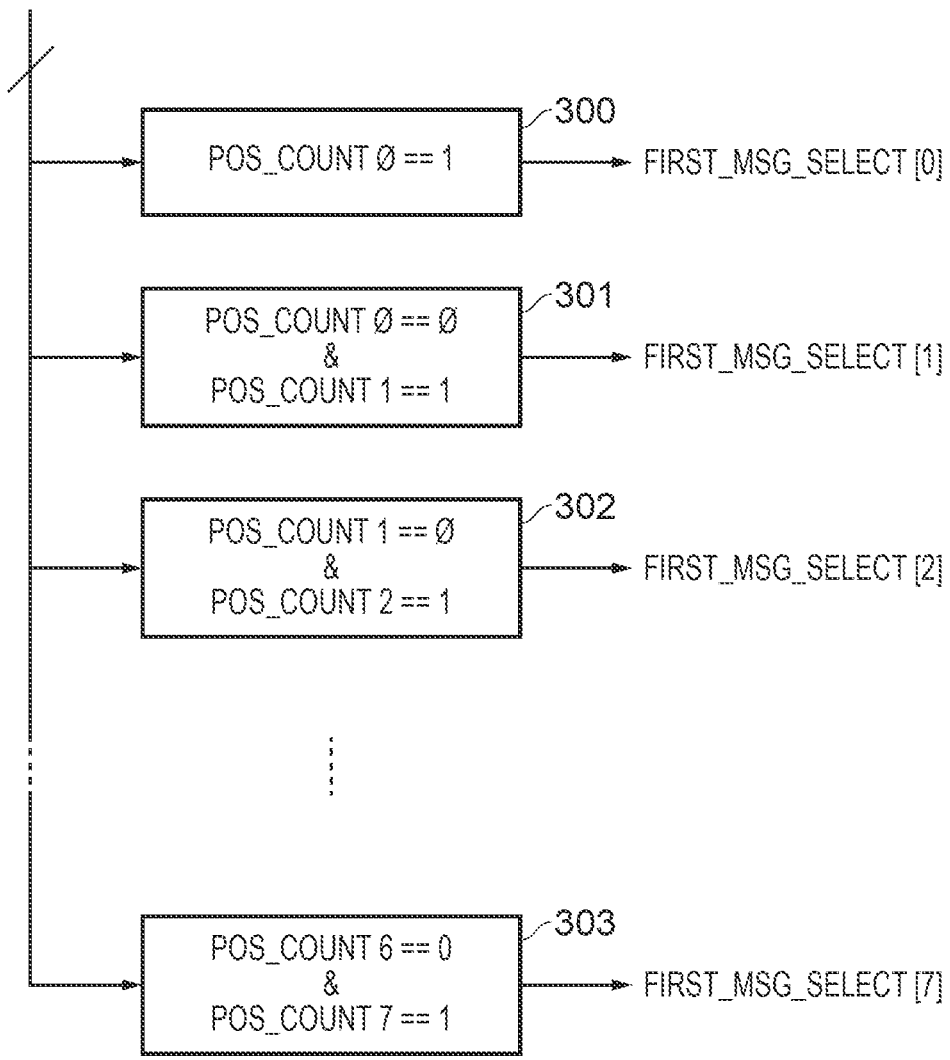
FIG. 4 and FIG. 5 schematically illustrate ordinal sub-component determination circuitry according to some examples.

The sum values from the counter/adder circuitry provide the inputs to ordinal sub-component determination circuitry arranged to determine the ordering of the valid data sub-components. FIG. 4 schematically illustrates ordinal sub-component determination circuitry in some examples, comprising a set of combinatorial logic circuitry 300, 301, 302, and 303. The first logic circuitry 300 determines if POS_COUNT0==1, i.e. if there is a valid data sub-component indicated for the first position. Each of the subsequent logic circuitry instances 301, 302, 302 then determines whether a POS_COUNT transition from 0 to 1 occurs at that position. This generates a "one hot" output FIRST_MSG_SELECT[0:7] indicating the position of the first data sub-component in the data item, here this being the first message in the data item. By definition this first data sub-component can only be at one position and this corresponds to the positon sat which the POS_COUNT transition from 0 to 1 occurs. Accordingly the full set of FIRST_MSG_SELECT values generated are:

FIRST_MSG_SELECT[0]=(POS_COUNT0==1)

FIRST_MSG_SELECT[1]=(POS_COUNT0==0)&
(POS_COUNT1==1)

FIRST_MSG_SELECT[2]=(POS_COUNT1==0)&
(POS_COUNT2==1)

FIRST_MSG_SELECT[3]=(POS_COUNT2==0)&
(POS_COUNT3==1)

FIRST_MSG_SELECT[4]=(POS_COUNT3==0)&
(POS_COUNT4==1)

FIRST_MSG_SELECT[5]=(POS_COUNT4==0)&
(POS_COUNT5==1)

FIRST_MSG_SELECT[6]=(POS_COUNT5==0)&
(POS_COUNT6==1)

FIRST_MSG_SELECT[7]=(POS_COUNT6==0)&
(POS_COUNT7==1)

Figure 5:
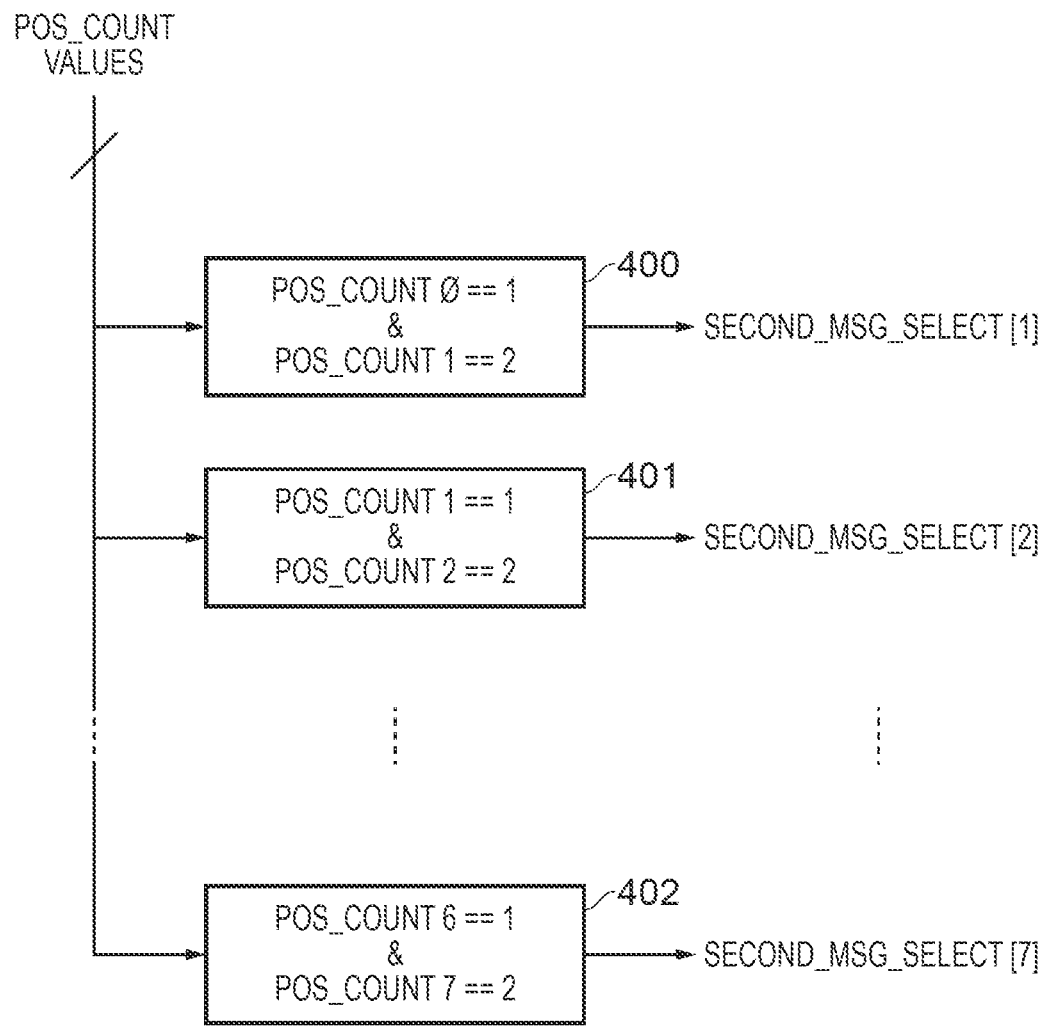

In a similar manner FIG. 5 schematically illustrates ordinal sub-component determination circuitry in some examples, comprising a set of combinatorial logic circuitry 400, 401, and 402. These determine where the POS_COUNT transition from 1 to 2 occurs, in order to determine the position of the second data sub-component. This generates a "one hot" output SECOND_MSG_SELECT[0:7] indicating the position of the second data sub-component in the data item, here this being the second message in the data item. Note that of course SECOND_MSG_SELECT[0] signal is generated, since by definition the second data sub-component cannot be at the first position.

Accordingly the full set of SECOND_MSG_SELECT values generated are:

SECOND_MSG_SELECT[1]=(POS_COUNT0==1)
&(POS_COUNT1==2)

SECOND_MSG_SELECT[2]=(POS_COUNT1==1)
&(POS_COUNT2==2)

SECOND_MSG_SELECT[3]=(POS_COUNT2==1)
&(POS_COUNT3==2)

SECOND_MSG_SELECT[4]=(POS_COUNT3==1)
&(POS_COUNT4==2)

SECOND_MSG_SELECT[5]=(POS_COUNT4==1)
&(POS_COUNT5==2)

SECOND_MSG_SELECT[6]=(POS_COUNT5==1)
&(POS_COUNT6==2)

SECOND_MSG_SELECT[7]=(POS_COUNT6==1)
&(POS_COUNT7==1)

Further analogous ordinal sub-component determination circuitry is provided to identify further data sub-component positions as required, generating further one hot signals THIRD_MSG_SELECT, FOURTH_MSG_SELECT etc. Note that there are no positional feedbacks paths, i.e. each of the [ordinal position]_MSG_SELECT signals can be generated in parallel, and an earlier ordered positon does not need to be found before finding a later ordered position. This decreases the path delays allowing this logic to run at higher frequencies, which is desirable for sub-component (message) unpacking logic that is running in a single cycle.

Figure 6A:
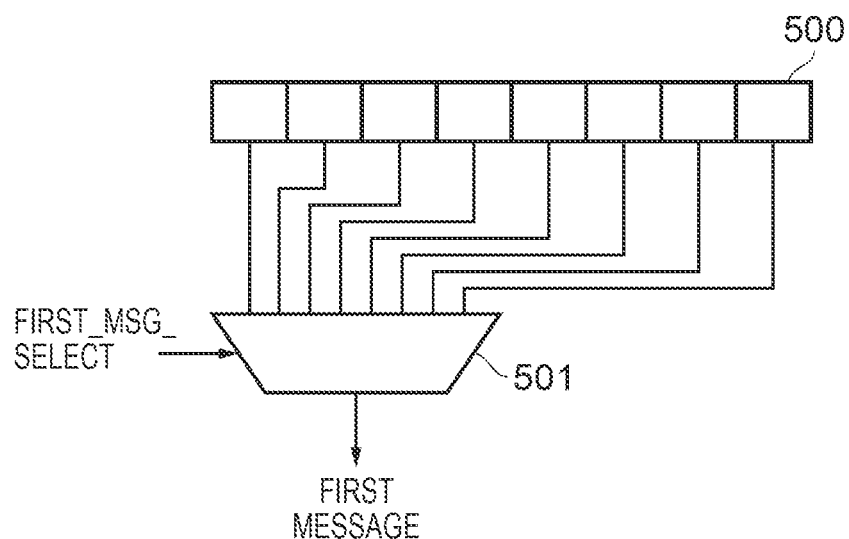
FIGS. 6A, 6B, and 6C schematically illustrate multiplexing circuitry to output first, second, and third data sub-components according to some examples.
Figure 6B:
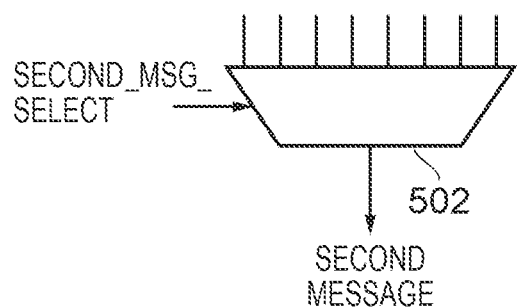
Figure 6C:
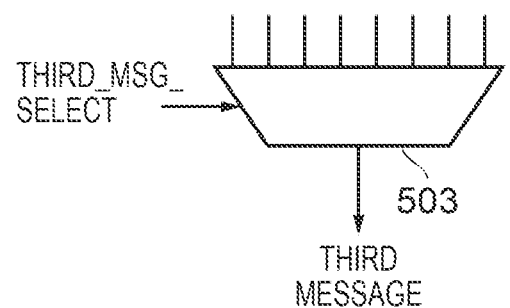

The respective one hot select signals are then used to control multiplexing circuitry to output the respective ordered valid data sub-components. FIGS. 6A-6C schematically illustrate examples of such multiplexing circuitry. Multiplexer 501 is steered by the FIRST_MSG_SELECT signal, such that the corresponding data subcomponent of a data item 500 is output as the first data sub-component (message). Similarly, multiplexer 502 is steered by the SECOND_MSG_SELECT signal, such that the corresponding data subcomponent of the data item 500 is output as the second data sub-component (message) and multiplexer 503 is steered by the THIRD_MSG_SELECT signal, such that the corresponding data subcomponent of the data item 500 is output as the third data sub-component (message).

Figure 7:
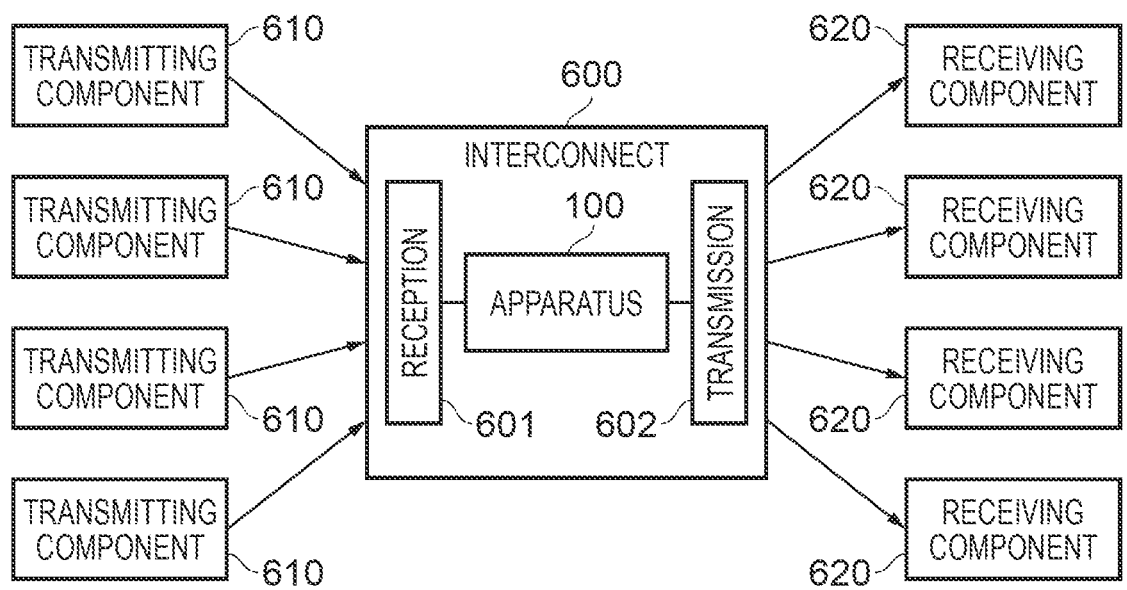
FIG. 7 schematically illustrates an interconnect apparatus according to some examples.

The present techniques may be applied in a wide variety of contexts. FIG. 7 schematically illustrates an example implementation, where the apparatus (such as apparatus 100 of FIG. 1) forms part of an interconnect 600. The interconnect 600 forms part of a system-on-chip and provides data paths between various other data processing components which also form part of the system-on-chip. These data processing components are conceptually illustrated in FIG. 7 as being transmitting components 610 and receiving components 620. The interconnect 600 enables a transmitting component 610 to signal to and send data to a receiving component 620. Nevertheless it should be understood that many components in such a system will in play both roles (i.e. transmitter and receiver). In the context of the present techniques, transmitting component 610 transmits a data item which is handled by the interconnect 600. The data item is received by reception circuitry 601, before being processed in the manner described herein by the apparatus 100. With the respective, ordered, valid data subcomponents thus identified and extracted, these can be forwarded to appropriate destinations, such as via transmission circuitry 602 to one of the receiving components 620. To give further specific, though still merely exemplary, contexts, the interconnect 600 might be provided in accordance with a protocol such as cache coherent interconnect for accelerators (CCIX) or compute express link (CXL) in a system-on-chip comprising a CPU and various accelerator devices. The data item comprising multiple data sub-components may therefore in some examples be a 512 bit flit which should be unpacked to allow the multiple messages which it holds to be sent to the correct requesters and agents. The signals and messages thus exchanged may therefore take a wide variety of forms, such as request messages, response messages and/or data transmission messages in some cases as well as read data, snoop data, request data and/or snoop responses.

Figure 8:
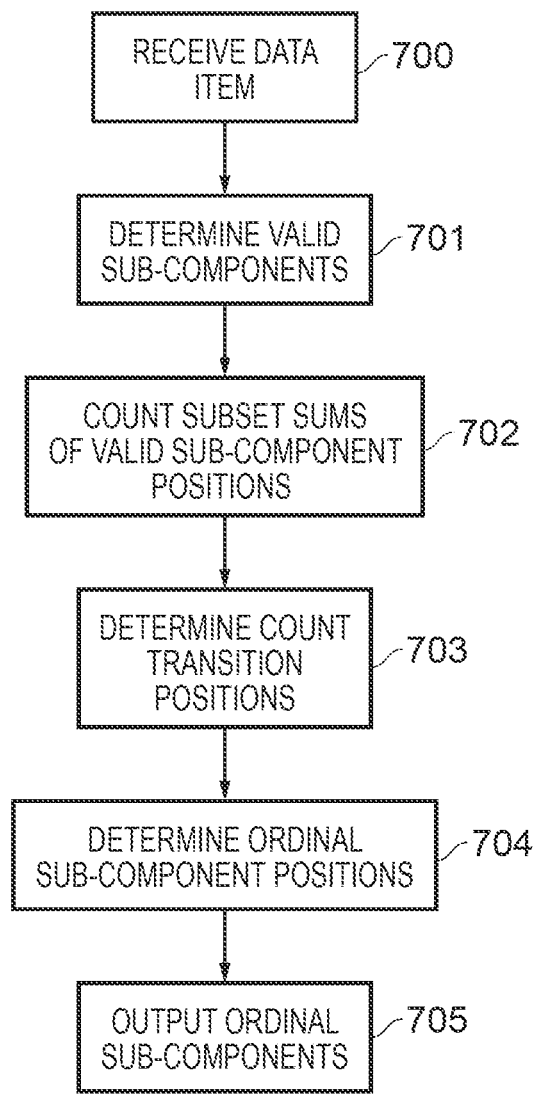
FIG. 8 shows a sequence of steps which are taken according to the method of some examples.

FIG. 8 shows a sequence of steps which are taken in accordance with the method of some examples. A data item is received at step 700. The valid data sub-component positions are then determined at step 701. On the basis of these, at step 702, subsets of the valid sub-component positions are summed (counted). The counter transition positions are identified at step 703. On the basis of these positions the ordinal sub-component positions are then determined at step 704 and the ordinal sub-components are output at step 705.

In brief overall summary apparatuses and methods for extracting ordered data sub-components from a data item are disclosed. A received data item has a data structure to accommodate multiple data sub-components. The data item indicates which data sub-components are valid. Adders sum respective subsets of indications of the valid data sub-component positions, with each adder covering one more position than the previous adder. Transitions of the counts generated by the respective adders are used to determine the ordinal valid data sub-component positions in the data item, which can then be output on the basis of the data item and the identified transition positions. Without requiring feedback paths from an identified earlier ordinal position to identify a later ordinal position, the set of ordered data sub-components can be extracted more quickly.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. Apparatus comprising:
    reception circuitry configured to receive a data item, wherein the data item has a data structure to accommodate up to N data sub-components at N respective positions within the data item, wherein the N respective positions run from a first position to a last position in the data item and wherein N is a plural value;
    sub-component indicator extraction circuitry configured to extract a set of N indications from the data structure, wherein a valid indication of the set of N indications indicates that there is a valid data sub-component at an equivalent position of the N positions within the data item;
    adder circuitry comprising N−1 adders, wherein each adder of the N−1 adders corresponds to a corresponding position of the N positions within the data item and each adder is configured to sum a subset of the set of N indications, wherein the subset comprises all valid indications inclusively from the first position of the N positions within the data item to the corresponding position of the N positions within the data item;
    ordinal sub-component determination circuitry configured to determine a first valid data sub-component position in the data item where the respective sums of the N−1 adders transition to a value of one from a value of zero or where a valid indication at the first position has a value of one,
    and the ordinal sub-component determination circuitry is configured to determine at least one further ordinal valid data sub-component position in the data item where the respective sums of the N−1 adders transition to a value of X from a value of X−1, wherein X−1 is the ordinality of the further ordinal position; and
    multiplexing circuitry configured to output a first valid data sub-component and at least one further ordinal valid data sub-component from the data item, wherein the multiplexing circuitry is controlled by the first valid data sub-component position and the at least one further ordinal valid data sub-component position determined by the ordinal sub-component determination circuitry.

2. The apparatus as claimed in claim 1, wherein the ordinal sub-component determination circuitry is configured to generate one-hot sequences as indications of the first valid data sub-component position and the at least one further ordinal valid data sub-component position for control of the multiplexing circuitry.

3. The apparatus as claimed in claim 1, wherein the ordinal sub-component determination circuitry is configured to determine plural further ordinal valid data sub-component positions in the data item.

4. The apparatus as claimed in claim 1, wherein the adder circuitry comprises adder circuitry configured to sum the respective subsets of the set of N indications.

5. The apparatus as claimed in claim 1, further comprising transmission circuitry configured to transmit the first valid data sub-component and the at least one further ordinal valid data sub-component output from the multiplexing circuitry to respective recipients indicated in the data item.

6. The apparatus as claimed in claim 5, wherein the data sub-components of the data item comprise messages for conveyance to the respective recipients, wherein the messages comprise:
    request messages;
    response messages; and/or
    data transmission messages.

7. The apparatus as claimed in claim 5, wherein the apparatus forms part of interconnect circuitry which couples multiple system components to one another and the reception circuitry is configured to receive the data item from one of the multiple system components, and wherein the transmission circuitry configured to transmit the first valid data sub-component and the at least one further ordinal valid data sub-component output from the multiplexing circuitry to respective recipient system components of the multiple system components as indicated in the data item.

8. The apparatus as claimed in claim 7, wherein the data sub-components of the data item comprise messages for conveyance to the respective recipients, wherein the messages comprise:
    read data;
    snoop data;
    request data; and/or
    snoop responses.

9. The apparatus as claimed in claim 1, wherein valid data sub-components are indicated by a respective set of validity bits in the data item.

10. The apparatus as claimed in claim 1, wherein valid data sub-components are indicated by a header information in the data item.

11. Interconnect circuitry comprising the apparatus as claimed in claim 1.

12. A system-on-chip comprising the apparatus as claimed in claim 1.

13. A method comprising:
    receiving a data item, wherein the data item has a data structure to accommodate up to N data sub-components at N respective positions within the data item, wherein the N respective positions run from a first position to a last position in the data item and wherein N is a plural value;
    operating sub-component indicator extraction circuitry to extract a set of N indications from the data structure, wherein a valid indication of the set of N indications indicates that there is a valid data sub-component at an equivalent position of the N positions within the data item;

operating adders comprising N−1 adders, wherein each adder of the N−1 adders corresponds to a corresponding position of the N positions within the data item and each adder is configured to sum a subset of the set of N indications, wherein the subset comprises all valid indications inclusively from the first position of the N positions within the data item to the corresponding position of the N positions within the data item;

operating ordinal sub-component determination circuitry to determine a first valid data sub-component position in the data item where the respective sums of the N−1 adders transition to a value of one from a value of zero or where a valid indication at the first position has a value of one;

determining at least one further ordinal valid data sub-component position in the data item where the respective sums of the N−1 adders transition to a value of X from a value of X−1, wherein X−1 is the ordinality of the further ordinal position; and outputting a first valid data sub-component and at least one further ordinal valid data sub-component from the data item, in dependence on the first valid data sub-component position and the at least one further ordinal valid data sub-component position determined by the ordinal sub-component determination circuitry.

* * * * *